(12) United States Patent
Johnson

(10) Patent No.: US 8,051,408 B1
(45) Date of Patent: Nov. 1, 2011

(54) METHOD OF PROVIDING INTERACTIVE USAGE DESCRIPTIONS BASED ON SOURCE CODE ANALYSIS

(75) Inventor: Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1307 days.

(21) Appl. No.: 10/940,037

(22) Filed: Sep. 13, 2004

(51) Int. Cl.
*G06F 9/44* (2006.01)
*G06F 9/45* (2006.01)
*G06F 3/00* (2006.01)

(52) U.S. Cl. ......... 717/125; 717/110; 717/144; 715/705

(58) Field of Classification Search .................. None
See application file for complete search history.

(56) References Cited

U.S. PATENT DOCUMENTS

| | | | | |
|---|---|---|---|---|
| 6,014,134 A * | 1/2000 | Bell et al. | ...................... | 715/705 |
| 6,305,008 B1 * | 10/2001 | Vaidyanathan et al. | ...... | 717/111 |
| 6,314,559 B1 * | 11/2001 | Sollich | ........................... | 717/111 |
| 6,367,068 B1 * | 4/2002 | Vaidyanathan et al. | ...... | 717/143 |
| 6,502,233 B1 * | 12/2002 | Vaidyanathan et al. | ...... | 717/101 |
| 6,505,243 B1 * | 1/2003 | Lortz | ........................... | 709/220 |
| 6,618,852 B1 * | 9/2003 | van Eikeren et al. | ......... | 717/108 |
| 7,313,784 B2 * | 12/2007 | Hawley et al. | ................ | 717/110 |
| 2003/0028860 A1 * | 2/2003 | Sumida et al. | ................ | 717/125 |
| 2004/0205726 A1 * | 10/2004 | Chedgey et al. | ............. | 717/125 |
| 2005/0015747 A1 * | 1/2005 | Zatloukal et al. | ............. | 717/109 |

OTHER PUBLICATIONS

Keith Franklin, Aug. 20, 2001, Sams, Part of the Sams White Book series, 29.*
Kennedy et al., Interactive Parallel Programming Using the ParaScope Editor [online], May 24, 1994 [retrieved on Jul. 22, 2011], pp. 1-33. Retrieved from the Internet: <URL: http://www.cs.utexas.edu/users/mckinley/papers/ped.pdf>.*
Minica Nakamine, From the Editors Desk: An introduction to interactive Journalism [online], Jun. 7, 2011 [retrieved on Jul. 22, 2011], pp. 1-6. Retrieved from the Internet: <URL: http://blog.marketwire.com/2011/06/07/from-the-editor%E2%/80%99s-desk-an-introduction-to-interactive-journalism/>.*

* cited by examiner

*Primary Examiner* — Thuy Dao
*Assistant Examiner* — Hanh Bui
(74) *Attorney, Agent, or Firm* — Nelson Mullins Riley & Scarborough LLP

(57) ABSTRACT

A method of dynamically analyzing source code to generate usage hints for a user performing program editing is disclosed. The functions in a collection of source code being edited by a user are processed so as to generate a parse tree data structure for each function called. The incoming and outgoing arguments in the parse tree are identified. Subsequently, a user editing code calls the function and either completely or incompletely enters the arguments as part of the function called. Input arguments are identified and associated with the corresponding argument in the parse tree for the function. Relevant preconditions and post-conditions of the surrounding nodes corresponding to the current location are analyzed. Usage hints are provided for the completion of the function call. Arguments for a completed function call argument entered by the user are validated. Error messages are delivered in the event of an invalid call.

27 Claims, 4 Drawing Sheets

METHOD OF PROVIDING INTERACTIVE USAGE DESCRIPTIONS BASED ON SOURCE CODE ANALYSIS

FIELD OF THE INVENTION

The illustrative embodiment of the present invention relates generally to interactive editing of programs, and more particularly to the interactive editing of programs using source code analysis to dynamically generate usage hints.

BACKGROUND

Interactive editing of programs makes use of techniques such as "tab completion" which allow the user to type in a fragment of a name, such as a file name or function name and then hit a designated key such as the tab key. If the file name or function name is unique, the interactive editing program extends the partially entered input with the unique completion of the name. Where there are multiple choices, the interactive editing program may provide a menu of choices from which the user may select the proper completion of a name. This sort of auto completion is now seen frequently in non-programming environments as well, such as the auto completion feature of a web browser which fills in a partially entered address.

Unfortunately, the provision of hints in a program development environment becomes increasingly more difficult as the size of the program leads to more possible inputs by the user. The list of possible responses at each stage of input grows as the program evolves. The list needs to be constantly updated as additional functions or options are added to the program, a requirement that quickly becomes tedious and difficult with larger programs. A related problem in the interactive editing field is the difficulty in validating dynamically whether entered input is valid for a completed function call. The same issues present with the auto complete process, i.e. difficulty maintaining and updating a list of valid responses, is present for validation.

BRIEF SUMMARY OF THE INVENTION

The illustrative embodiment of the present invention dynamically analyzes source code in order to generate usage hints for a user performing program editing. The functions in a collection of source code being edited by a user are processed so as to generate a parse tree data structure for each function called. The incoming and outgoing arguments in the parse tree are identified. Subsequently, a user editing code calls the function and either completely or incompletely enters the arguments as part of the function called. The illustrative embodiment of the present invention may be called manually by the user such as by selecting a file menu option or pressing a hot key or may deploy automatically based on the passage of time between the user starting to enter a function call and finishing a function call. The user's input arguments are identified and associated with the corresponding argument in the parse tree for the function being called. Based on the location in the parse tree, the relevant preconditions and post-conditions of the surrounding nodes corresponding to the current location are analyzed according to a pre-determined collection of rules. Based on the analysis, usage hints are provided back to the user for the completion of the function call. In the case of a completed function call argument entered by the user, the illustrative embodiment of the present invention compares the type and number of arguments in the completed function call to the required type and number of arguments of the function in order to validate the function call. Appropriate error messages are delivered to the user in the event of an invalid call.

In one embodiment of the present invention in a program development environment, a method of analyzing source code to provide an interactive usage hint during a user function call includes the step of identifying the incoming and outgoing arguments in a parse tree data structure created by processing the source code for a function in a program. Subsequently a user function call of the function used to create the parse tree data structure is received. The user function call is at least partially completed. The function call is analyzed to identify the number of outgoing arguments and incoming arguments that have been generated. The arguments identified in the function call are associated with the identified incoming and outgoing arguments that were previously identified in the parse tree data structure. At least one usage hint is then provided interactively to the user based on the identified location in the parse tree of the entered argument.

In another embodiment, in an electronic device with a programming environment which has a language processor, a method includes the step of providing a collection of source code which includes the source code of at least one function. The language processor is used to process the source code for a function in order to create a parse tree data structure. The arguments in the parse tree data structure corresponding to the function are identified. The method subsequently receives a user function call of the function that was used to create the parse tree data structure, the function call being at least partially completed. The arguments in the function call are identified and then associated with the identified arguments in the parse tree data structure. The method then provides at least one usage hint interactively to the user based on the identified location in the parse tree of the associated argument from the function call.

In an embodiment of the present invention in a program development environment, a method of analyzing source code to provide an interactive usage hint during a user function call includes the step of making an incomplete function call. The method further includes the step of receiving a usage hint for the incomplete function call in response to the incomplete function call, the usage hint being generated by identifying the arguments in a parse tree data structure created by processing the source code for the function and comparing the arguments in the parse tree data structure with information from the incomplete function call.

BRIEF DESCRIPTION OF THE DRAWINGS

These and other aspects of this invention will be readily apparent from the Detailed Description below and the appended drawings, which are meant to illustrate and not limit the invention and in which.

DETAILED DESCRIPTION

The illustrative embodiment of the present invention dynamically analyzes source code in order to generate usage hints and validate function calls for a user performing program editing. The rules-based analysis analyzes the current location in a parse tree data structure generated from the source code of a function being called. The analysis is performed to provide validation of arguments in completed function calls and suggestions as to missing or incomplete arguments for an incomplete function call. The rules-based analysis identifies pre-conditions, post-conditions and forward pre-conditions of the nodes in the source code for the function being called in order to generate the validation or usage hint that is provided to the user.

Figure 1:
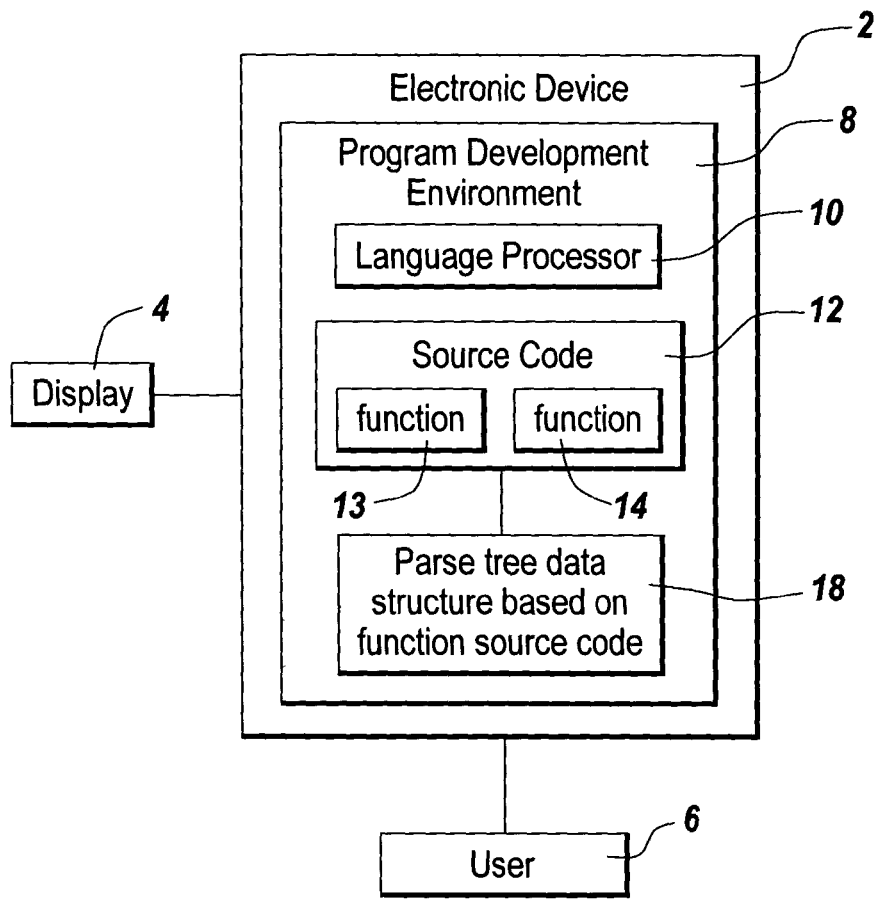
FIG. 1 depicts an environment suitable for practicing the illustrative embodiment of the present invention.

FIG. 1 depicts an environment suitable for practicing the illustrative embodiment of the present invention. The electronic device 2 is connected to a display 4 and is accessible to a user 6. An electronic device 2 supports a program development environment 8 which includes a language processor 10 and a collection of source code 12. The collection of source code 12 includes source code for functions 13 and 14. Also depicted is a parse tree data structure 18 generated from source code for one of the functions 13 and 14. A parse tree consists of a set of data structures called "nodes", each of which has a number of "descendents" (also called "children") that appear as other nodes. Nodes represent program fragments that possess meaning according to the grammar of the program, and are labeled accordingly. For example, a node might be labeled PLUS, representing a plus sign, NAME, representing a name, NUMBER, representing a number, or "expression", representing an expression. Typically, each node corresponds to some set of input characters in the input of the program. The details of the kinds of nodes, the number of descendents, and the set of legal parse trees is very dependent on the particular programming language being processed. Techniques for analyzing a program and building a parse tree data structure are well known to those skilled in the state of the art (see Aho, Sethi, and Ullman: Compilers, Principles, and Tools, Addison-Wesley, 1986). A separate parse tree is generated for each function 13 and 14 in the source code 12. Those skilled in the art will realize that the collection of source code 12 may contain more functions than the two depicted herein without departing from the scope of the present invention. Alternatively, the source code 12 may also contain a single function without departing from the scope of the present invention.

The electronic device 2 may be a server, workstation, desktop, laptop, pda, or other device equipped with processor and capable of supporting the program development environment 8. An example of the program development environment 8 includes MATLAB from The MathWorks of Natick Mass. The program development environment 8 may also be a graphical programming environment such as the SIMULINK programming environment also from The MathWorks. The language processor 10 is used to generate the parse tree data structure based on the function 13 or 14. The source code 12 may be in any language supported by the program development environment 8 such as M or C in the case of a MATLAB program development environment. The illustrative embodiment of the present invention may be practiced using both structured programming languages and object oriented programming languages.

The function source code 13 or 14 typically has an "interface" that is defined between the function and the rest of the application (those skilled in the art will recognize that although only the term "function" is used throughout this description of the illustrative embodiment, the terms "methods" and "procedures" may be substituted as appropriated depending on the programming language being used without departing from the scope of the present invention). The interface accepts some data from the rest of the application (called the "inputs" or "input arguments"), operates on that data, and produces some result data (called the "outputs" or "output arguments"). In some cases, functions can access external data, report an error or otherwise modify the state of the application, but input and output arguments are the primary ways that functions interact with the application. While it should be understood that the illustrative embodiment of the present invention also applies to the non-standard ways of interacting with the rest of the application, for explanatory purposes only input and output arguments of functions are discussed herein.

Functions that are called with user input typically have two phases, validation of the arguments and execution. The illustrative embodiment performs actions in both phases. Depending on the programming language, validation may include the number of input and output arguments, the type, size, and range of the data, and (for string data) that the string is one of a number of legal options. If the data is not acceptable, an error message is generated. Many programming languages require function interfaces to specify the data types that are legal in uses of the function. Most modern languages with data types are "strongly typed", in that these specifications are required. However, the specification of type requirement can make the language less attractive for interactive work, so many interactive languages are "typeless", that is, variables are not declared to have a specific type but may adopt whatever type is assigned to them. In typeless languages, analysis of the called function can put requirements on the legal types for the input. For all languages, analysis of the called function can provide information about data ranges, allowable options, and allowable combinations for the number of input and output variables. Both typeless and typed languages may be validated by the illustrative embodiment of the present invention.

An example of code that may be analyzed by the illustrative embodiment is seen below:

function x=foo(y)
   if ~ischar(y)||length(y)≧4
   error('input must be <4 characters long');
   end
end The function code is converted into a parse tree. The parse tree allows the logical structure of the program to be determined. Uses of the input variable(s) are identified and various rules are applied (example rules are discussed in detail below). In this example, two conditions must both be true for the input y—the first is that the input must be a character string, and the second that the length of this string must be less than 4. A user typing a call to foo, or entering data that will be passed to foo may request help with the input or pause during input. The illustrative embodiment of the present invention uses the parse tree to feed the partially completed string to the two recognized conditions. If either condition fails to be true, the same error message that would be produced on execution can be given to the user.

Figure 2:
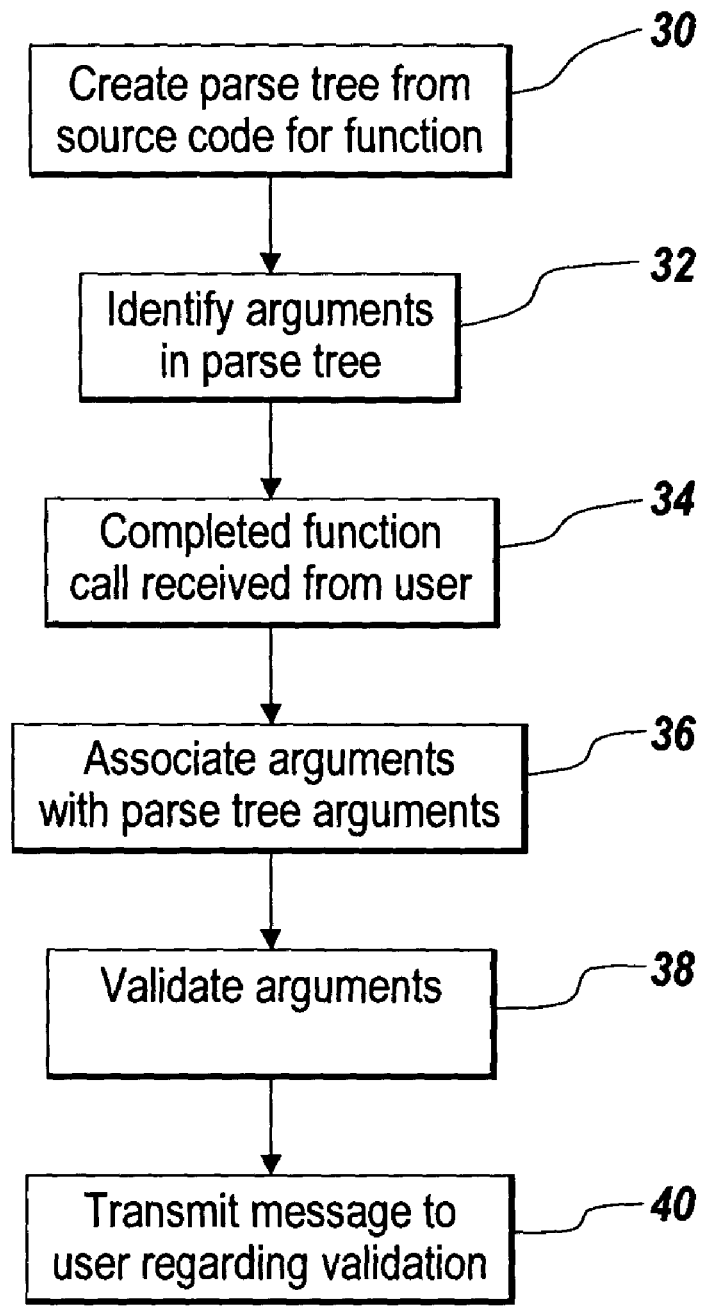
FIG. 2 is a flow chart of the sequence of steps followed by the illustrative embodiment of the present invention to validate a completed user function call.

FIG. 2 depicts the sequence of steps followed by the illustrative embodiment of the present invention to validate a completed function call entered by a user. The sequence begins with the creation of a parse tree data structure 18 based on function source code 13 or 14 (step 30). As noted earlier, there are a number of well-known mechanisms and procedures that may be used to generate the parse tree from the source code. For example, the parse tree may be generated from a compiler. Additionally, in the event an existing parse tree of the function code already exists, the illustrative embodiment of the present invention may make use of the existing parse tree without generating a new data structure. Incoming and outgoing arguments in the parse tree are then identified (step 32). Subsequently, a user completes the function call (step 34). The arguments from the completed function call are identified and associated with the corresponding arguments in the parse tree data structure generated from the source code for the called function (step 36). Characteristics such as the number and type of the arguments entered by the user are verified (step 38). Appropriate messages are then transmitted to the user regarding the validation of the completed function call (step 40). The message may indicate that the function call was a proper function call, or may indicate a type or number mismatch between what the user entered and what the function required. It should also be noted that in addition to the user specifically requesting validation of the completed function call, the editing environment may be configured so as to automatically validate every completed function call entered by the user.

In addition to performing validation of completed functions, the illustrative embodiment of the present invention may also be used to provide interactive usage hints to a user editing code that has entered an incomplete function call. The usage hints/messages may be provided either in response to the user's request or automatically, such as in response to the satisfaction of the time delay during a user's editing of an application. For example, a user editing code for a function call may input an argument for the function and then pause at which point the interactive editing program may provide the usage hints as set forth herein after a set time period.

Figure 3:
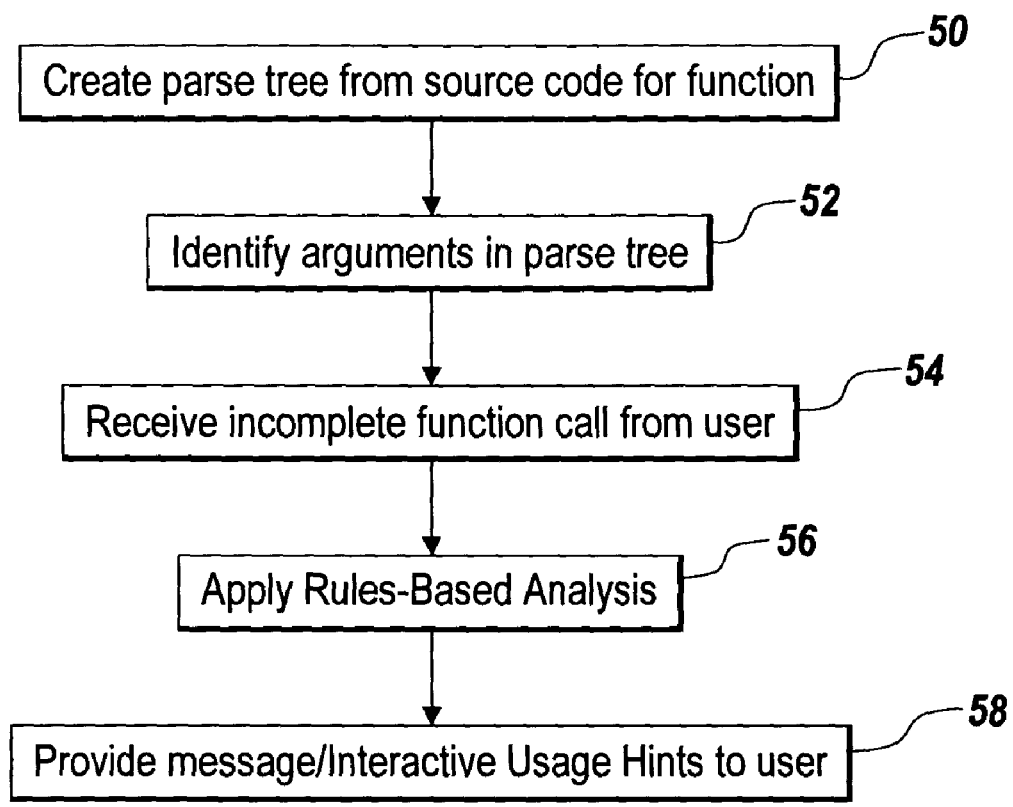
FIG. 3 is a flow chart of the sequence of steps followed by the illustrative embodiment of the present invention to generate usage hints concerning an incomplete function call.
Figure 4:
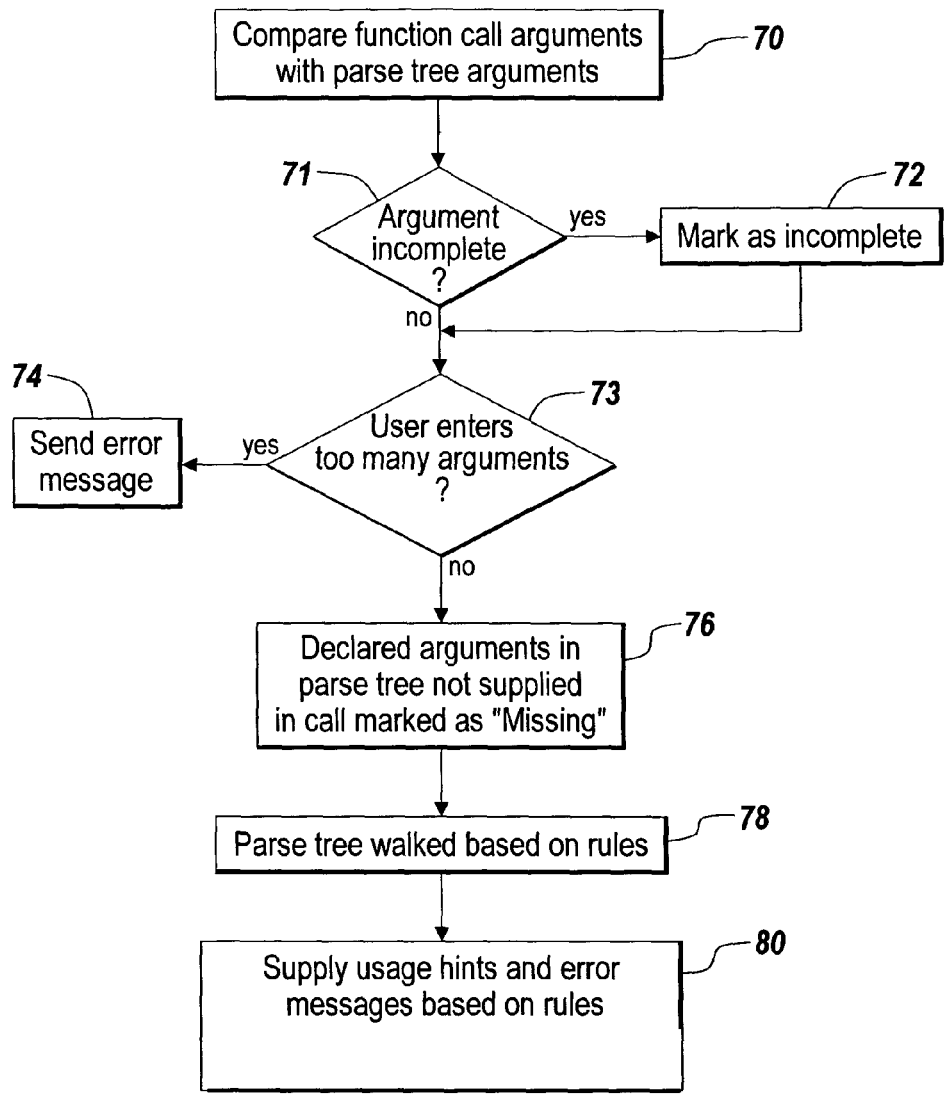
FIG. 4 depicts a sequence of steps followed by the illustrative embodiment of the present invention to apply probability theory analysis to an incomplete function call for the purpose of supplying usage hints to a user engaged in interactive editing of a program.

FIG. 3 depicts the overall sequence of steps engaged in by the illustrative embodiment of the present invention to generate usage hints in response to an incomplete function call, and FIG. 4 examines the rules-based analysis engaged in by the illustrative embodiment of the present invention in more detail.

The overall sequence of steps followed to apply a rule-based analysis to the parse tree data structure 18 of the function 13 or 14 being called is depicted in FIG. 3. The sequence begins when a parse tree data structure is generated from the source code for a function (step 50). The arguments in the parse tree corresponding to the function source code are identified (step 52). The user subsequently makes an function call (step 54) which may lack one or more necessary arguments, or contain arguments that are incomplete. A rules-based analysis is then applied to the function call analyzing the parse tree data structure of the function source code taking into account the supplied arguments(step 56). In the case of validation, the call supplied by the user is nominally complete and is just being checked. Based on the analysis, an appropriate message providing an interactive usage hint or error message is provided to the user (step 58), or the call is recognized as valid.

The rules-based analysis is used to evaluate possibly incomplete function calls. The intent of the analysis is to process a function $f$ with partially known information and return whatever information can be obtained about the legality of the inputs to $f$ supplied by the function call. This is done by doing a treewalk with a set of rules whose intent is to generate information at each node in the tree of the form "If, when executing $f$ with the supplied arguments this node is encountered, then the following conditions are true". Information regarding the legal inputs of a function is obtained by moving forward through the execution of the program. For example, if a statement sets a variable x equal to 3, then the condition (x==3) is true when the successor to that statement is entered. Similarly, information regarding the legal inputs of a function may be obtained by moving backwards through the execution. For example, if the only successor of a node N produces an error message when x is zero, and N does not change the value if x, then the same condition is true when N is entered. Treewalks are discussed in more detail below in conjunction with the explanation of FIG. 4.

The illustrative embodiment of the present invention evaluates numerous conditions as part of the rules-based analysis including forward preconditions, postconditions and preconditions. Forward preconditions are conditions known to be true upon entry to a given node through forward analysis. The forward precondition for node N is referred to herein as F(N). Postconditions are conditions known to be true when control exits a given node in the forward analysis. Postconditions for node N herein are referred to as Q(N). Preconditions result from doing the forward and backward analysis on a node N to produce a new, stronger precondition referred to herein as P(N).

Examples of various conditions are:
A variable x has a known string, numeric, or name value.
A variable x has a known type or size.
A variable x has an unknown value.
A variable x is undefined or missing.
These conditions are combined through Boolean operators (&, |, and ~) to make up preconditions and postconditions. Examples of the types of rules supplied by the illustrative embodiment of the present invention are given below. Those skilled in the art will recognize that the rules are illustrative of the form of rules rather than an exhaustive list.
For particular kinds of nodes N (and specific forward preconditions F(N)):

i) Visit the descendents of N in an order determined by the rule. The rule specifies how to determine the forward precondition with which each descendent is visited. For each node that is visited, determine the postconditions.

ii) Using the postconditions generated from visiting the descendents, compute the Q(N), the postconditions for N.

iii) Visit the successor node(s), with forward preconditions determined by the rule from Q(N). These visits return the preconditions for each of the successors.

iv) Visit the descendent nodes under control of the rule, passing in the preconditions returned by the successors or a rule-modified version thereof, and generate the precondition for each descendent.

v) Combine the preconditions of the descendents according to the rule to compute the precondition P(N).
It should be noted that most rules have a "down" phase where forward preconditions are passed to descendents, a "forward" phase where preconditions from predecessors are passed to successors, an "up" phase, where preconditions generated from successors and passed to descendents are made available to the node, and a "backward" phase, where the precondition generated from the successor(s) of a node are used to generate the precondition for the node.

The illustrative embodiment of the present invention also provides specific rules for constructs common to many programming languages. Conditions involving variables can be specialized to one not involving a variable or set of variables. For example:
Let A be a condition involving a variable, x and other variables. Let S(A) be the specialization of A that does not involve x. S(A) is either a condition or NULL. Then:
If A can be written as ~B, S(A)=~S(B)
If A can be written as B & C, S(A)=S(B) & S(C)
If A can be written as B|C, S(A)=S(B)|S(C)

In the previous three rules, NULL behaves like:
~NULL=NULL
NULL & A=A
NULL|A=NULL
If A does not mention x, S(A)=A;
If A has the form x OP B, then S(A)=NULL
These rules are adaptable as required to account for different forms of operators and conditions in different programming languages.

The illustrative embodiment of the present invention also allows for substitution and simplification of the rules. If a condition A involves a variable x, an expression e may be substituted for the value x to obtain another condition. After substitution, simplification may be performed. Simplifying an expression means taking advantage of the rules of logic to recognize and eliminate parts of the condition that are redundant or are always true or false. For example:

If a node N represents an assignment of an integer n to variable x, a rule might be:

i) Letting S mean specialization by removing terms involving x, compute Q(N) from F(N) by the rule: Q(N)=S(F(N)) & (x==n) (forward rule).

ii) Any parts of the new precondition returned from the successor that do not mention x become parts of the new precondition returned from N (backward rule).

iii) Any parts of the new precondition returned from the successor of N that mention x are evaluated with the integer substituted for x. If the condition is trivially true (e.g., does not involve any other variables), it is deleted. If the condition is trivially false, an error may be so reported (or as an implementation choice it may be concluded that the actual control flow is too complicated to analyze, and the error should be ignored). In either case, the condition is deleted from the returned precondition. If the condition is nontrivial after the substitution is made, it is returned as a part of the new precondition of N.

Conditional statements found in function code by the illustrative embodiment of the present invention may be handled by a rule.

If node N is an IF statement, it will have three descendents (a condition, called C, a THEN clause T and an ELSE clause E) and a successor S (which is also the successor of both T and E). A sample rule for IF statements might be:

i) If F(N) implies that the condition C is true, then replace N by T and delete C and E and their children (forward rule).

ii) If F(N) implies that the condition C is false, then replace N by E and delete C and T and their children (forward rule).

iii) Otherwise, visit T with the precondition (F(N) & C) and visit E with the precondition (F(N) & ~C). Then Q(N) is (Q(T) Q(N)) (forward rule).

iv) After visiting the successor, visit both T and E with P(S) as the new precondition. Then compute P(N)=(P(T)|P(E)).
This analysis can be extended to rules that correspond to more complicated assignment and conditional statements. In particular, if N is a SWITCH statement, in many programming languages it behaves like a sequence of IF statements. In this case, it can be handled similarly to the previous case.

It should also be noted that depending on the particular programming language conventions, loops may be examined for special cases (for example, the processing of attribute-value pairs). In the general case, however, the contents of loops may be ignored because they usually do not involve the validation of arguments. This decision makes the processing of functions much quicker and is an implementation choice. Additionally, depending on the availability of the source code and the semantics of the programming language being analyzed, function calls may be recursively analyzed. The forward preconditions on inputs to a sub-function can be specialized to involve only the input arguments, and used to produce preconditions to the call. The analysis can be driven by a table for specific built-in functions. In the general case, function calls can be recursively analyzed to deliver the same information as would be imparted in a single function call. Performance considerations may limit the amount of recursive analysis to be carried out.

FIG. 4 depicts the sequence of steps followed by the rules-based analysis in greater detail. The embodiments described herein may be practiced in an electronic device having a program development environment by utilizing a computer-readable medium holding computer-executable steps for carrying out the embodiments. The sequence begins by comparing the identified incomplete function call arguments with the parse tree arguments (step 70). If an argument is in the process of being typed (step 71), the interactive usage function is activated and the argument is marked as INCOMPLETE (step 72). If the user enters more arguments then the declared function has (as determined by examining the parse tree generated from the function) (step 73) the user is sent an error message (step 74). Alternatively, if the number of arguments declared by the user is less than those identified in the parse tree, the missing arguments in the parse tree are marked as MISSING (step 76). The parse tree is then walked based on previously specified rules so as to identify possible and likely missing arguments (step 78).

Starting at the root of the parse tree, the nodes of the tree are examined in the order in which they would be executed, except that some nodes may be returned to multiple times. This operation is called a "tree walk", and is well known to those skilled in the art. This tree walk is controlled by a set of rules that tell which nodes should be visited and when. These rules depend on the kind of node encountered, information passed down from node visited previously, additional information attached to the node (such as the indication that an argument is INCOMPLETE), and information that may be computed on nodes farther down the tree and then used. The actual set of rules used depends on the characteristics of the programming language, usage conventions appropriate to the interactive environment, and an engineering tradeoff between partial information being generated quickly and more complete information being generated with some delay. Once the treewalk is completed, the results of the analysis are then used to supply usage hints and error messages to the user who had entered the function call (step 80).

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a program development environment executing on a computing device, a method of analyzing source code to provide an interactive usage hint during a user function call, the method comprising:
    processing in the program development environment a function contained in source code for a program written in a typeless language in which variable types are not required to be explicitly declared, the processing creating a parse tree data structure from the function written in the typeless language;

identifying in the programming development environment incoming and outgoing arguments in the parse tree data structure;

receiving in the programming development environment, subsequent to the creating of the parse tree data structure from the function written in the typeless language, a user function call of the function used to create the parse tree data structure, the user function call being at least partially completed;

analyzing in the programming development environment the function call to identify incoming and outgoing arguments, associating in the programming development environment the identified incoming and outgoing arguments in the function call with the incoming and outgoing arguments identified in the created parse tree data structure, the associating identifying a current location in the parse tree data structure;

evaluating nodes surrounding the current location in the parse tree data structure to determine at least one of a forward precondition, precondition and post-condition; and displaying at least one usage hint interactively to the user based on the evaluating.

2. The method of claim 1 wherein the usage hint that is provided interactively is generated by a rules-based analysis of the identified location in the parse tree data structure of the associated arguments.

3. The method of claim 1 wherein the usage hint includes an error message.

4. The method of claim 1 wherein the usage hint automatically completes the function call in a proper format.

5. The method of claim 1 wherein the usage hint includes a menu of options presented to the user.

6. The method of claim 1 wherein the usage hint is given in response to an incomplete function call.

7. The method of claim 1 wherein the program development environment is a graphical programming environment.

8. The method of claim 1, wherein the user function call is complete and the method further comprises:
analyzing the function call for in order to validate the user function call.

9. The method of claim 8 wherein the analyzing identifies at least one of a missing and incomplete argument.

10. The method of claim 1 wherein the function call is analyzed as part of a recursive analysis of function calls.

11. In an electronic device having a programming environment with a language processor, a method comprising:
providing in the program development environment a collection of source code including at least one function, the source code written in a typeless language in which variable types are not required to be explicitly declared;

using in the program development environment the language processor to process a function in the source code written in the typeless language to create a parse tree data structure;

identifying in the program development environment arguments in the parse tree data structure;

receiving in the program development environment, subsequent to the creating of the parse tree data structure from the function written in the typeless language, a user function call of the function used to create the parse tree data structure, the user function call being at least partially completed;

identifying in the program development environment arguments in the function call;

associating in the program development environment the identified arguments in the function call with the arguments identified in the created parse tree data structure, the associating identifying a current location in the parse tree data structure;

evaluating nodes surrounding the current location in the parse tree data structure to determine at least one of a forward precondition, precondition and post-condition; and displaying at least one usage hint interactively to a user based on the evaluating.

12. The method of claim 11 wherein the usage hint that is provided interactively is generated by a rules-based analysis of the identified location in the parse tree data structure of the associated arguments.

13. A non-transitory medium storing computer-executable instructions for analyzing source code to provide an interactive usage hint during a user function call, the instructions when executed causing a computing device to:

process in a program development environment a function contained in source code for a program written in a typeless language in which variable types are not required to be explicitly declared, the processing creating a parse tree data structure from the function written in the typeless language;

identify in the program development environment incoming and outgoing arguments in the parse tree data structure;

receive in the program development environment, subsequent to the creating of the parse tree data structure from the function written in the typeless language, a user function call of the function used to create the parse tree data structure, the user function call being at least partially completed;

analyze in the program development environment the function call to identify incoming and outgoing arguments, associate in the program development environment the identified incoming and outgoing arguments in the function call with the incoming and outgoing arguments identified in the created parse tree data structure, the associating identifying a current location in the parse tree data structure;

evaluate nodes surrounding the current location in the parse tree data structure to determine at least one of a forward precondition, precondition and post-condition; and display at least one usage hint interactively to a user based on the evaluating.

14. The medium of claim 13 wherein the usage hint that is provided interactively is generated by a rules-based analysis of the identified location in the parse tree data structure of the associated arguments.

15. The medium of claim 13 wherein the usage hint includes an error message.

16. The medium of claim 13 wherein the usage hint automatically completes the function call in a proper format.

17. The medium of claim 13 wherein the usage hint includes a menu of options presented to the user.

18. The medium of claim 13 wherein the usage hint is given in response to an incomplete function call.

19. The medium of claim 13 wherein the program development environment is a graphical programming environment.

20. The medium of claim 13, wherein the user function call is complete and wherein the execution of the instructions further causes the computing device to:

analyze the function call in order to validate the user function call.

21. The medium of claim 20 wherein the analysis identifies at least one of a missing and incomplete argument.

22. The medium of claim 13 wherein the function call is analyzed as part of a recursive analysis of function calls.

23. The medium of claim 13 wherein the parse tree data structure is generated by a compiler.

24. A non-transitory medium storing computer-executable instructions for analyzing source code to provide an interactive usage hint during a user function call, the instructions when executed causing a computing device to:

provide a collection of source code including at least one function, the collection of source code written in a typeless language in which variable types are not required to be explicitly declared;

use a language processor to process a function in the source code written in the typeless language to create a parse tree data structure;

identify arguments in the parse tree data structure;

receive, subsequent to the creating of the parse tree data structure from the function written in the typeless language, a user function call of the function used to create the parse tree data structure, the user function call being at least partially completed;

identify arguments in the function call;

associate the identified arguments in the function call with the arguments identified in the created parse tree data structure, the associating identifying a current location in the parse tree data structure;

evaluate nodes surrounding the current location in the parse tree data structure to determine at least one of a forward precondition, precondition and post-condition; and display at least one usage hint interactively to a user based on the evaluating.

25. The medium of claim 24 wherein the usage hint that is provided interactively is generated by a rules-based analysis of the identified location in the parse tree data structure of the associated arguments.

26. A system for analyzing source code to provide an interactive usage hint during a user function call, the system comprising:

a computing device hosting a program development environment and including:

a collection of source code from a program written in a typeless language in which variable types are not required to be explicitly declared, the source code including a plurality of functions;

a language processor used to process the source code for at least one of the plurality of functions; and at least one parse tree data structure generated by the language processor processing the source code written in the typeless language for the at least one of the plurality of functions, the parse tree data structure used to provide an interactive usage hint for a user function call of the function used to generate the parse tree data structure, the user function call being at least partially completed, and where:

arguments in the user function call are identified, the identified arguments in the user function call are associated with corresponding arguments in the parse tree data structure, the associating identifying a current location in the parse tree data structure, and nodes surrounding the current location in the parse tree data structure are evaluated to determine at least one of a forward precondition, precondition and post-condition; and a display device for displaying the interactive usage hint based on the evaluating.

27. The system of claim 26 wherein the user function call is determined to be complete and a type and number of arguments in the function call are validated.

* * * * *